US010372667B2

(12) United States Patent
Kinoshita

(10) Patent No.: US 10,372,667 B2
(45) Date of Patent: Aug. 6, 2019

(54) COMMUNICATION APPARATUS AND CONTROL METHOD THEREOF

(71) Applicant: CANON KABUSHIKI KAISHA, Tokyo (JP)

(72) Inventor: Akihisa Kinoshita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 495 days.

(21) Appl. No.: 15/189,602

(22) Filed: Jun. 22, 2016

(65) Prior Publication Data

US 2016/0378714 A1    Dec. 29, 2016

(30) Foreign Application Priority Data

Jun. 24, 2015    (JP) ................................ 2015-126871

(51) Int. Cl.
*G06F 15/173* (2006.01)
*H04L 1/16* (2006.01)
*H04L 29/06* (2006.01)

(52) U.S. Cl.
CPC .......... *G06F 15/17331* (2013.01); *H04L 1/16* (2013.01); *H04L 69/163* (2013.01)

(58) Field of Classification Search
None
See application file for complete search history.

(56) References Cited

U.S. PATENT DOCUMENTS

| 5,544,306 A * | 8/1996 | Deering ............... G06T 15/405 |
| | | 345/531 |
| 6,151,641 A * | 11/2000 | Herbert ................ G06F 3/0607 |
| | | 710/22 |
| 6,529,945 B1 * | 3/2003 | Calhoun ................ H04L 49/90 |
| | | 365/185.33 |
| 7,499,412 B2 * | 3/2009 | Matityahu .............. H04L 41/22 |
| | | 370/255 |

(Continued)

FOREIGN PATENT DOCUMENTS

| JP | 2012-182551 A | 9/2012 |
| JP | 2015046866 A | 3/2015 |

OTHER PUBLICATIONS

Notification of Reasons for Refusal issued by the Japanese Patent Office dated Jun. 10, 2019 in corresponding Japanese Patent Application No. 2015-126871, with English translation.

*Primary Examiner* — Backhean Tiv
(74) *Attorney, Agent, or Firm* — Carter, DeLuca & Farrell LLP

(57) ABSTRACT

A communication apparatus includes the first memory unit which stores data to be a sending target to another communication apparatus and the second memory unit accessible at higher speed than the first memory unit, and transfers the sending target data to the second memory unit concurrently with transfer of the data to the first memory unit. The communication apparatus sends the sending target data from the second memory unit to the other communication apparatus and discards the data from the second memory unit after that sending and before receiving a response to the data (Continued)

from the other communication apparatus. When resending the data, resending processing to the other communication apparatus is performed based on the data transferred to the first memory unit.

17 Claims, 7 Drawing Sheets

(56) References Cited

U.S. PATENT DOCUMENTS

| | | | |
|---|---|---|---|
| 7,826,469 B1* | 11/2010 | Li | H04L 47/2441 370/412 |
| 2002/0184471 A1* | 12/2002 | Hatae | G06F 15/8007 712/22 |
| 2003/0193927 A1* | 10/2003 | Hronik | H04L 49/90 370/351 |
| 2003/0210684 A1* | 11/2003 | Lai | H04L 49/103 370/381 |
| 2005/0055481 A1* | 3/2005 | Chou | G06F 13/387 710/52 |
| 2005/0083917 A1* | 4/2005 | Okamoto | H04L 29/06 370/352 |
| 2006/0031565 A1* | 2/2006 | Iyer | H04L 49/90 709/234 |
| 2006/0092934 A1* | 5/2006 | Chung | H04L 47/2441 370/389 |
| 2009/0157946 A1* | 6/2009 | Arya | G06F 13/4239 711/103 |
| 2009/0300296 A1* | 12/2009 | Yasui | H04L 49/90 711/154 |
| 2012/0079167 A1* | 3/2012 | Yao | G06F 12/0246 711/103 |
| 2015/0006970 A1* | 1/2015 | Hanssen | G06F 11/2221 714/45 |
| 2015/0039821 A1* | 2/2015 | Sasaki | G06F 13/1673 711/105 |
| 2015/0199150 A1* | 7/2015 | Jeon | G11C 7/1078 711/114 |
| 2016/0335182 A1* | 11/2016 | Teodorescu | G06F 16/9024 |
| 2016/0378714 A1* | 12/2016 | Kinoshita | G06F 15/17331 709/212 |
| 2017/0099332 A1* | 4/2017 | Bullotta | H04L 69/22 |

* cited by examiner

COMMUNICATION APPARATUS AND CONTROL METHOD THEREOF

BACKGROUND OF THE INVENTION

Field of the Invention

The present invention relates to a communication apparatus and a control method thereof.

Description of the Related Art

Conventionally, there is a communication method using an acknowledgement called an ACK when a segment is received in order to ensure communication reliability in packet communication. For example, in TCP/IP widely utilized in Internet communication, it is necessary to manage a segment by a sequence number in an octet unit and to respond using the sequence number of the received segment as an ACK packet. Note that TCP/IP stands for Transmission Control Protocol/Internet Protocol.

In protocol processing of TCP/IP, a network buffer is prepared for packetization and resending processing of communication data. In sending of a TCP/IP packet, user data designated by a socket API send( ) is transferred to the network buffer and divided into MTUs (Maximum Transmission Units). Then, the check sum of the divided data and a pseudo header are calculated, and a TCP/IP packet added with a TCP header and an IP header is generated. If a transmission path is of Ethernet®, an Ethernet frame added with an Ethernet header is generated and sent.

Since a wide area of a memory is accessed to transfer data from a user buffer to a network buffer, and calculate a checksum, if the memory access speed is low, it is impossible to generate a TCP/IP packet at high speed. To increase the rate of TCP/IP packet communication, not CPU transfer but DMA transfer may be utilized or an SRAM that allows higher-speed access may be utilized as a network buffer instead of a DRAM when the data is transferred from the user buffer to the network buffer (Japanese Patent Laid-Open No. 2012-182551 (to be referred to as literature 1 hereinafter)).

Because of limitations on the cost and chip area, however, it is impossible to increase the memory size of the SRAM that allows higher-speed access, and to allocate a data buffer serving as a sufficient network buffer to the SRAM. In literature 1, the speed of sending processing by a specific socket is increased by dividing the network buffer into the DRAM and the SRAM to allocate, and utilizing the network buffer allocated to the SRAM for the specific socket.

In sending of TCP communication, however, resending is needed when an acknowledgement cannot be received within a predetermined time in a protocol. It is therefore impossible to release sent packet data until the acknowledgement is received. The network buffer of the SRAM cannot be released while the acknowledgement cannot be received, so a free area runs out. If the network buffer of the SRAM is not empty, the SRAM cannot be utilized in new sending and the DRAM is utilized instead. This causes a deterioration in high-speed communication.

SUMMARY OF THE INVENTION

A communication apparatus and a control method thereof according to an embodiment of the present invention implements stable high-speed communication by making a high-speed data buffer sufficiently available.

According to one aspect of the present invention, there is provided a communication apparatus comprising: a first memory unit configured to store data to be a sending target to another communication apparatus; a second memory unit accessible at higher speed than the first memory unit; a transfer unit configured to transfer the data to the second memory unit concurrently with transfer of the data to the first memory unit; a sending unit configured to send the data transferred from the transfer unit from the second memory unit to the other communication apparatus; a first discard unit configured to discard the data from the second memory unit after sending by the sending unit and before receiving a response to the data from the other communication apparatus; and a resending unit configured to perform resending processing to the other communication apparatus based on the data transferred to the first memory unit by the transfer unit when resending the data.

Also, according to another aspect of the present invention, there is provided a control method of a communication apparatus, the method comprising: transferring data to be a sending target to another communication apparatus to a second memory unit accessible at higher speed than a first memory unit concurrently with transfer of the data to the first memory unit; sending the transferred data from the second memory unit to the other communication apparatus; discarding the data from the second memory unit after sending the data and before receiving a response to the data from the other communication apparatus; and performing resending processing to the other communication apparatus based on the data transferred to the first memory unit when resending the data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Some preferred embodiments of the present invention will be described below with reference to the accompanying drawings.

<First Embodiment>

In communication with a plurality of connections, a single or a plurality of applications sometimes cannot use a network buffer (to be referred to as a high-speed buffer hereinafter) allocated to a high-speed memory such as an SRAM that allows higher-speed access. One of causes of this is that, in communication which needs an acknowledgement, it is impossible to release a high-speed buffer that has been used for sending until the acknowledgement has been received from a communication partner apparatus.

To cope with this, in a communication apparatus of the first embodiment, when sending target data is DMA-transferred to the network buffer, the sending target data is transferred to two points of the high-speed buffer and a network buffer (to be referred to as a normal buffer hereinafter) allocated to a normal memory such as a DRAM. Then, the high-speed buffer is released concurrently with sending of data to the communication partner apparatus and the normal buffer is reserved for resending of data until the acknowledgement is received from the communication partner apparatus. This makes it possible to efficiently use the high-speed buffer by a connection that needs high-speed communication.

Figure 1:
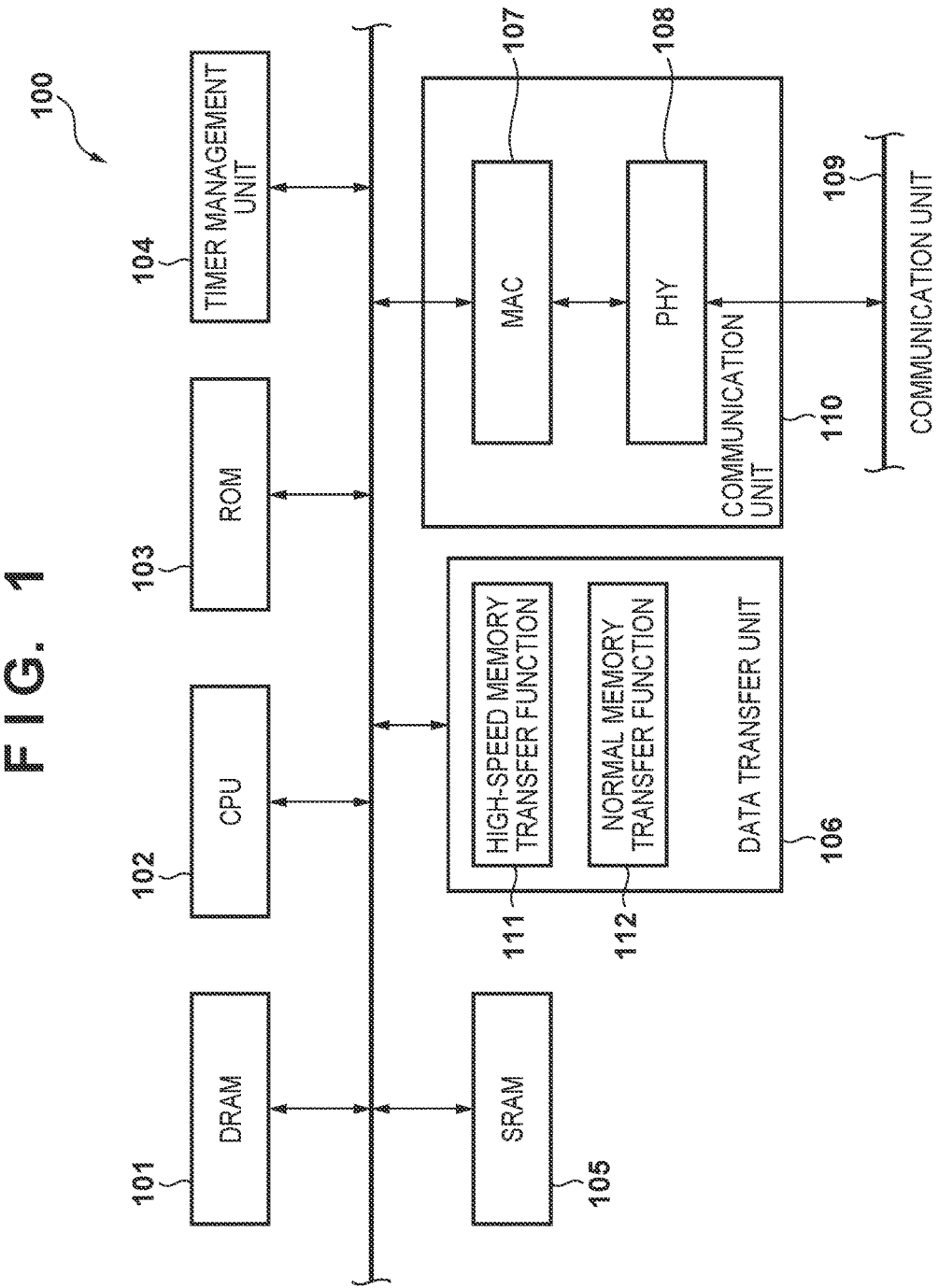
FIG. 1 is a block diagram showing the arrangement of a communication apparatus according to the first embodiment.

FIG. 1 is a block diagram showing an example of the arrangement of a communication apparatus 100 according to the first embodiment. In FIG. 1, a CPU 102 uses, as a work memory, a DRAM 101 serving as a main memory to execute various programs stored in a storage medium serving as a program storage unit such as a ROM 103 or a hard disk (not shown). Each program executed by the CPU 102 includes a network driver. The CPU 102 implements the functions of protocol processing including data processing of packetizing sending target data (to be described later) and acknowledgement reception processing by executing the network driver.

A media access control module (MAC 107) and a physical layer module (PHY 108) serve as a communication unit 110 for performing communication via a network such as Ethernet® 109. The CPU 102 executes the network driver, and controls the MAC 107, thereby sending/receiving data. In this arrangement, an arrangement using Ethernet® is shown. However, anything such as a wireless LAN (Wi-Fi) may be used as long as IP communication is possible.

The aforementioned arrangement is the same as that of a normal communication apparatus. However, the communication apparatus 100 of this embodiment also includes, in addition to the DRAM 101 serving as the normal memory, an SRAM 105 serving as a high-speed memory that allows higher-speed access than the normal memory. The DRAM 101 provides the first data buffers serving as the normal buffers. The SRAM 105 provides the second data buffers serving as the high-speed buffers. That is, the second data buffers allow higher-speed access than the first data buffers. The communication apparatus 100 further includes a data transfer unit 106 having a high-speed memory transfer function 111 and a normal memory transfer function 112. The high-speed memory transfer function 111 performs data transfer to the high-speed memory (SRAM 105) by a DMAC (Direct Memory Access Controller). The normal memory transfer function 112 performs data transfer to the normal memory (DRAM 101) by the DMAC. The communication apparatus 100 also includes a timer management unit 104 which manages various timers used in a protocol.

A packet used in this embodiment is a unit of data sent/received on the Internet. A method of assembling such a packet is well known, and thus a description thereof will be omitted here.

Figure 3:
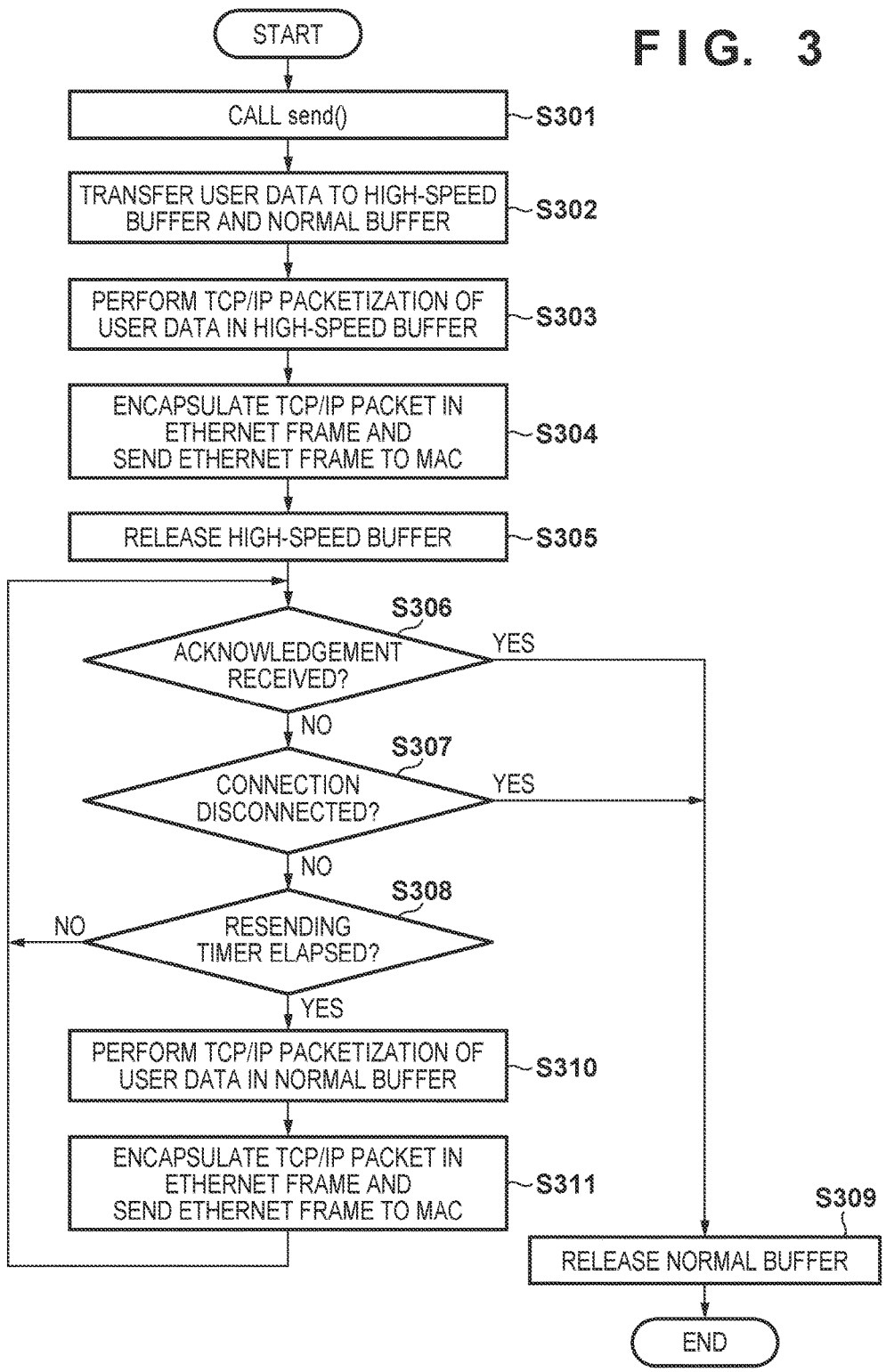
FIG. 3 is a flowchart showing communication processing according to the first embodiment.

Data sending by a socket API send( ) of the first embodiment will be described with reference to a flowchart of FIG. 3. First, in step S301, an application executed by the CPU 102 (to be simply referred to as an application hereinafter) calls the send( ). After the send( ) is called, in step S302, the network driver executed by the CPU 102 uses the data transfer unit 106 to transfer user data as the sending target data to the two points of the high-speed buffer and the network buffer. Note that the high-speed memory transfer function 111 transfers the user data to the high-speed buffer by the DMA and the normal memory transfer function 112 transfers the user data to a low-speed buffer by the DMA. User data transfer to the high-speed buffer and the low-speed buffer is executed substantially concurrently.

Figure 2:
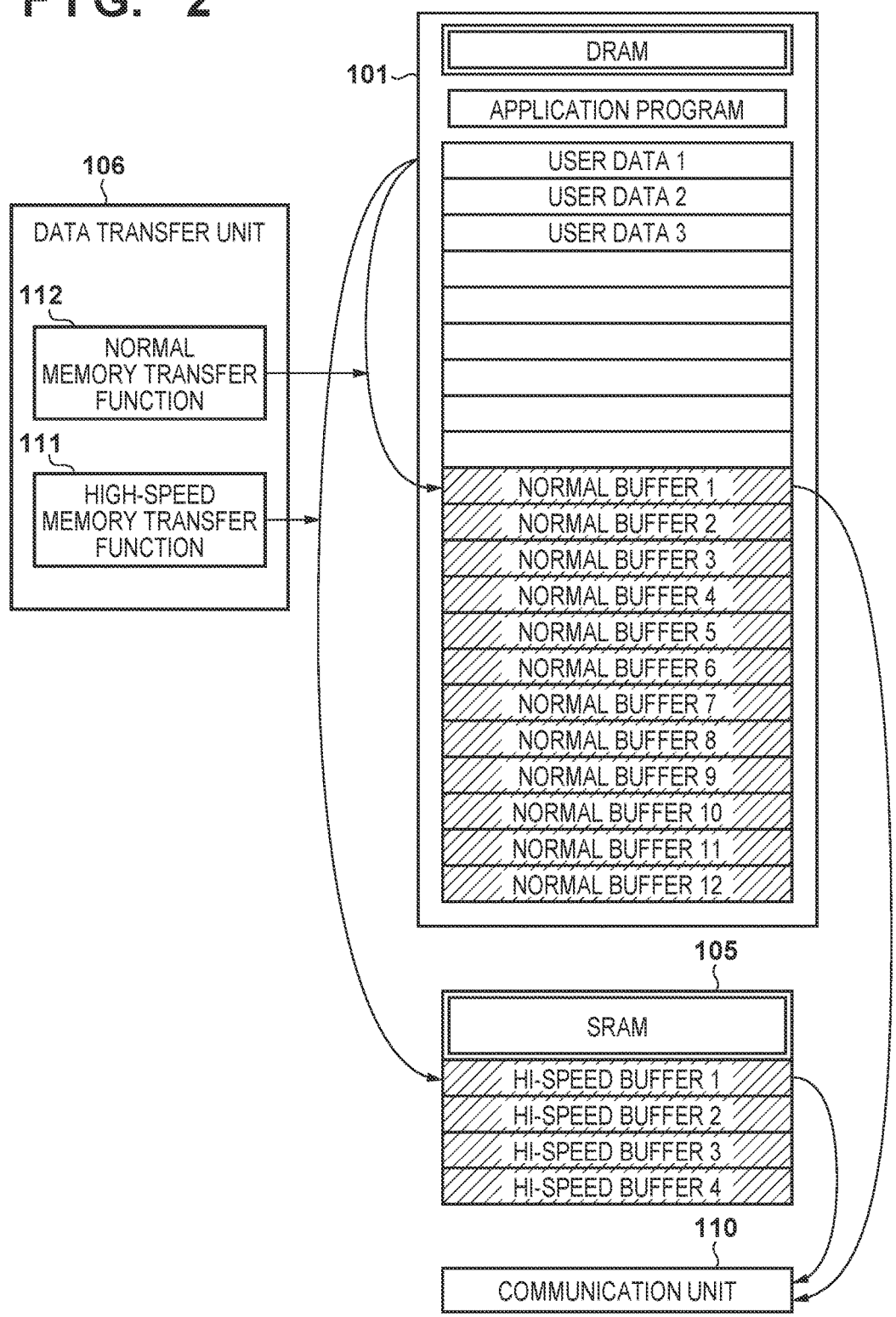
FIG. 2 is a diagram for explaining transfer processing of user data according to the first embodiment.

FIG. 2 is a diagram for explaining user data transfer according to the first embodiment. In FIG. 2, generated user data 1 to 3 are stored in predetermined regions of the DRAM 101. Each of user data 1 to 3 is data to be a target of sending via the communication unit 110 and is, for example, data generated by the CPU 102 under execution of a predetermined program. The data transfer unit 106 transfers user data 1 in the predetermined region in the DRAM 101 to two points of high-speed buffer 1 in the SRAM 105 and normal buffer 1 in the DRAM 101. Note that user data 1 transferred by the data transfer unit 106 may be discarded from the predetermined region upon completion of transfer. User data 1 transferred to high-speed buffer 1 is used to generate a packet at high speed. On the other hand, the normal buffer holds user data 1 as a sending target such that user data 1 can be resent. This allows the network driver to release high-speed buffer 1 (that is, discard user data 1 held by high-speed buffer 1) without waiting for a specific response (an acknowledgement in this embodiment) from the communication partner apparatus after a packet as sending data is generated or sent by using user data 1 transferred to high-speed buffer 1.

In steps S303 and S304, the network driver generates the packet as the sending data by using the user data transferred to the high-speed buffer and sends it to the communication partner apparatus. First, in step S303, the network driver calculates a checksum by using the user data transferred to the high-speed buffer, generates a TCP/IP header, and performs the TCP/IP packetization of the user data in the high-speed buffer. Furthermore, in step S304, the network driver generates an Ethernet header, encapsulates the TCP/IP packet in an Ethernet frame, and sends the Ethernet frame to the MAC 107. Once the encapsulated TCP/IP packet in the Ethernet frame has been sent, in step S305, the network driver releases the high-speed buffer which has held that user data. For example, in FIG. 2, the network driver implemented by the CPU 102 applies TCP/IP processing to user data 1 transferred to high-speed buffer 1 in the SRAM 105 and transfers user data 1 to the communication unit 110 serving as a network I/F (steps S303 and S304). After that, the network driver releases high-speed buffer 1 in the SRAM 105 (step S305). Note that a timing at which the high-speed buffer is released may be a point in time when the packet as the sending data is generated.

Next, the network driver determines whether the acknowledgement has been received, whether a connection with a communication partner has been disconnected, and whether it is a timing to resend the packet. That is, if the network driver determines in step S306 that the acknowledgement has been received or determines in step S307 that the connection has been disconnected, the process advances to step S309. On the other hand, if the acknowledgement has not been received and if the connection with the communication partner has not been disconnected, the process advances to step S308. In step S308, the network driver determines whether a resending timer managed by the timer management unit 104 has elapsed (whether it is a timing to resend data). If the resending timer has not elapsed, the process returns to step S306. If the resending timer has elapsed, the process advances to step S310.

In step S310, the network driver performs the TCP/IP packetization of the user data transferred to the normal buffer by the data transfer unit 106 in step S302. Then, in step S311, the network driver generates an Ethernet header, encapsulates the TCP/IP packet in an Ethernet frame®, and sends the Ethernet frame to the MAC 107. After that, the process returns to step S306. On the other hand, if the process advances from step S306 or S307 to step S309, it is confirmed that the TCP/IP packet has been sent. Therefore, in step S309, the network driver releases the normal buffer used as the transfer destination of the user data by the data transfer unit 106 in step S302.

In FIG. 2, the CPU 102 utilizes the user data held by normal buffer 1 in the DRAM 101 as resending data. That is, the CPU 102 applies the TCP/IP processing to the user data held by normal buffer 1, performs the TCP/IP packetization and the Ethernet packetization of the user data, and transfers it to the communication unit 110. After that, the network driver releases normal buffer 1 in the DRAM 101 (that is, discards the user data held by normal buffer 1).

As described above, according to the communication apparatus 100 of the first embodiment, in communication that needs an acknowledgement, each high-speed buffer and each normal buffer hold the sending target data. Then, the communication apparatus 100 first performs the packetization of the user data and sends it by using each high-speed buffer, and releases the high-speed buffer without waiting for a corresponding acknowledgement. On the other hand, for the user data held by each normal buffer, the communication apparatus 100 maintains a held state for resending until the acknowledgement is received from the communication partner. It is possible, by performing control as described above, to efficiently use each high-speed buffer by the connection that needs the high-speed communication.

More specifically, according to the first embodiment, it is possible to release the network buffer kept in the SRAM concurrently with sending by DMA-transferring the sending target data to two points of the network buffers arranged in the SRAM and the DRAM. Therefore, the network buffer arranged in the SRAM can utilize new sending target data. As a result, high-speed communication becomes possible that efficiently utilizes the network buffer of the SRAM whose memory size is not sufficiently large.

<Second Embodiment>

Communication processing of the second embodiment will now be described. In the first embodiment, the user data as the sending target data is transferred to both the high-speed buffers and the low-speed buffers, the high-speed buffers are used to send the user data and are released, and the user data held by the low-speed buffers is used for resending. A communication apparatus of the second embodiment transfers user data to be a sending target to each high-speed buffer, sends a packet generated by using the high-speed buffer from a communication unit 110, and causes each low-speed buffer to hold the packet. By doing so, the communication apparatus of the second embodiment can send the packet and release the high-speed buffer. Note that the arrangement of the communication apparatus of the second embodiment is the same as in the first embodiment (FIG. 1).

Figure 4:
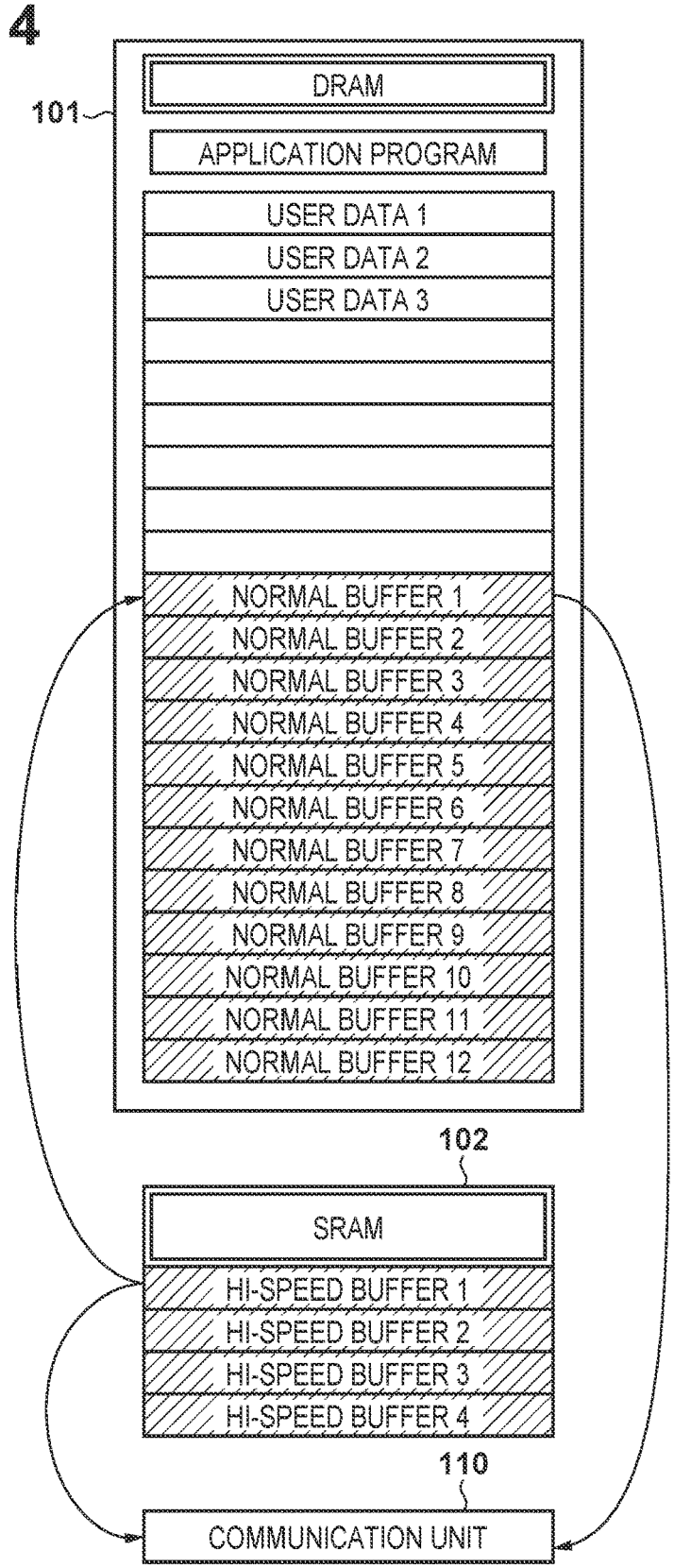
FIG. 4 is a diagram for explaining data transfer in communication processing according to the second embodiment.
Figure 5:
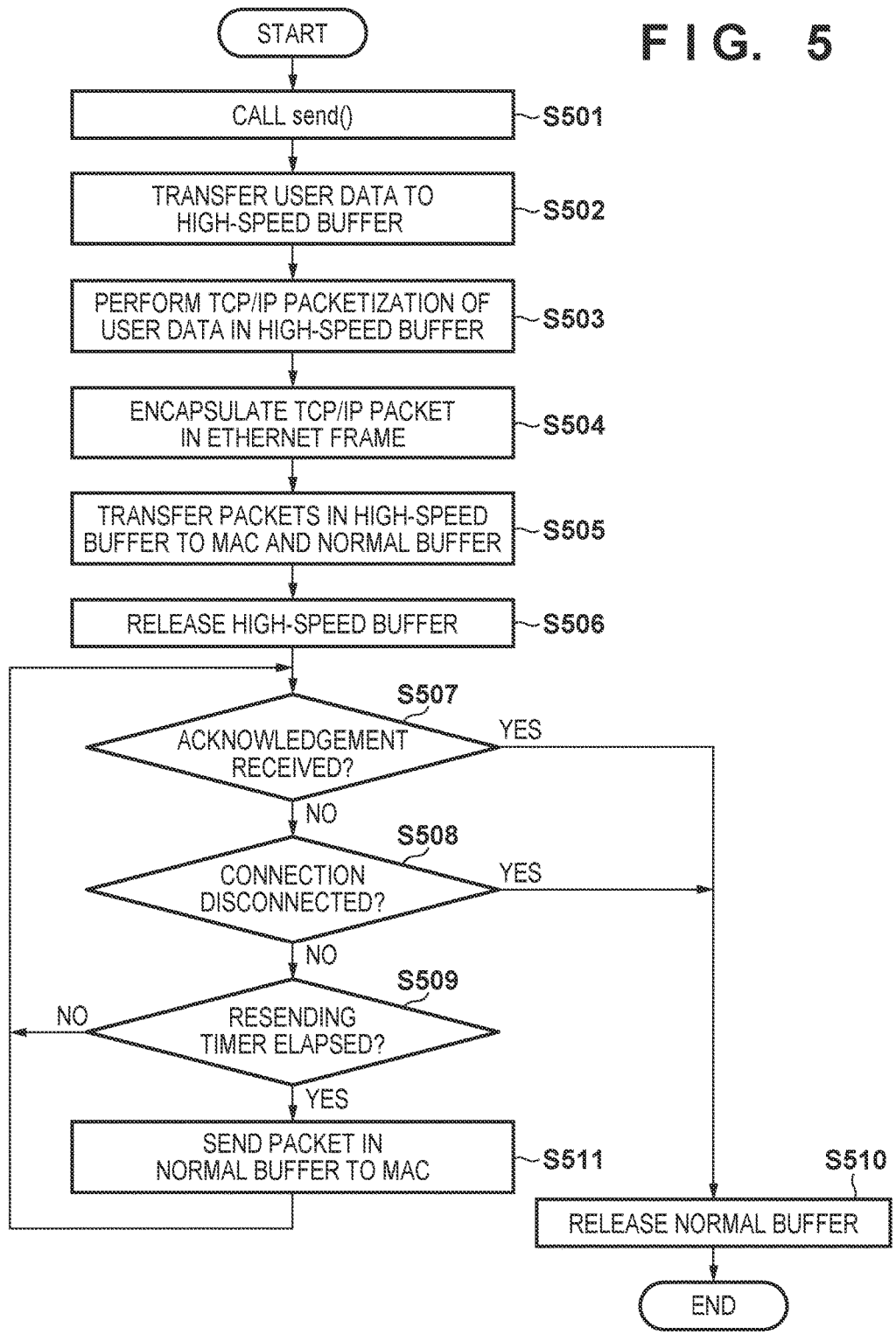
FIG. 5 is a flowchart showing the communication processing according to the second embodiment.

FIG. 4 is a diagram for explaining user data transfer according to the second embodiment. FIG. 5 is a flowchart for explaining communication processing by a communication apparatus 100 according to the second embodiment. Data sending by a socket API send( ) of the second embodiment will be described below with reference to FIGS. 4 and 5.

First, in step S501, an application executed by a CPU 102 calls the send( ). After the send( ) is called, a network driver executed by the CPU 102 transfers the user data to the high-speed buffer in step S502. One of data transfer by a data transfer unit 106 (high-speed memory transfer function 111) and data transfer by the CPU 102 may be used for data transfer in this step. Referring to FIG. 4, the data transfer unit 106 (or the CPU 102) transfers user data 1 in a DRAM 101 to high-speed buffer 1 in an SRAM 105.

In step S503, the network driver calculates the checksum of the user data held by each high-speed buffer, generates a TCP/IP header, and performs the TCP/IP packetization of the user data on the high-speed buffer. Furthermore, in step S504, the network driver generates an Ethernet header and encapsulates TCP/IP packets in an Ethernet frame on the high-speed buffer. In step S505, the network driver uses the data transfer unit 106 (normal memory transfer function 112) to transfer the TCP/IP packets encapsulated in the Ethernet frame in the high-speed buffer to two points of a MAC 107 and a normal buffer in the DRAM 101. In step S506, the network driver releases the high-speed buffer which has held corresponding user data because the TCP/IP packets have been sent.

The above-described processing will be described with reference to FIG. 4. The network driver applies TCP/IP processing and processing of encapsulation in the Ethernet frame to the user data held by high-speed buffer 1 in the SRAM 105, generating the packets (steps S503 and S504). The data transfer unit 106 data-transfers the generated packets to two points of the communication unit 110 serving as a network I/F and normal buffer 1 in the DRAM 101 (step S505). After that, the network driver releases high-speed buffer 1 in the SRAM 105 (step S506).

Next, the network driver determines whether an acknowledgement has been received, whether a connection with a communication partner has been disconnected, and whether it is a timing to resend the packet. That is, if the network driver determines in step S507 that the acknowledgement has been received or determines in step S508 that the connection has been disconnected, the process advances to step S510. On the other hand, if the acknowledgement has not been received and if the connection with the communication partner has not been disconnected, the process advances to step S509. In step S509, the network driver determines whether a resending timer managed by a timer management unit 104 has elapsed (whether it is a timing to resend the data). If the resending timer has not elapsed, the process returns to step S507. If the resending timer has elapsed, the process advances to step S511.

In step S511, the network driver obtains, as sending data, the TCP/IP packet transferred to the normal buffer in the DRAM 101 by the data transfer unit 106 in step S505 and sends it to the MAC 107, thereby resending the packet. After execution of resending, the process returns to step S507. In step S510, the normal buffer in the DRAM 101 used as a data transfer destination of the TCP/IP packet by the data transfer unit 106 in step S505 is released because completion of data sending has been confirmed.

In FIG. 4, normal buffer 1 in the DRAM 101 is utilized for data at the time of resending. If the resending timer has elapsed before receiving the acknowledgement, the CPU 102 (network driver) transfers the packet held by normal buffer 1 (the Ethernet frame in this embodiment) to the communication unit 110 serving as the network I/F. Then, after the acknowledgement is confirmed, the CPU 102 releases normal buffer 1 in the DRAM 101 (step S510).

As described above, according to the second embodiment, in a communication protocol which needs the confirmation of the acknowledgement, each high-speed buffer is released concurrently with sending to the communication partner and data is reserved in each normal buffer for resending until the acknowledgement is received from the communication partner. It is therefore possible to efficiently use each high-speed buffer by the connection that needs the high-speed communication.

<Third Embodiment>

Communication processing of the third embodiment will now be described. In the third embodiment, an arrangement will be described in which the communication processing is switched by automatically determining whether communication that uses both high-speed buffers and normal buffers is performed or whether communication that uses not the high-speed buffers but the normal buffers is performed. Note that a communication apparatus of the third embodiment has the same arrangement (FIG. 1) as in the first and second embodiments.

Figure 6:
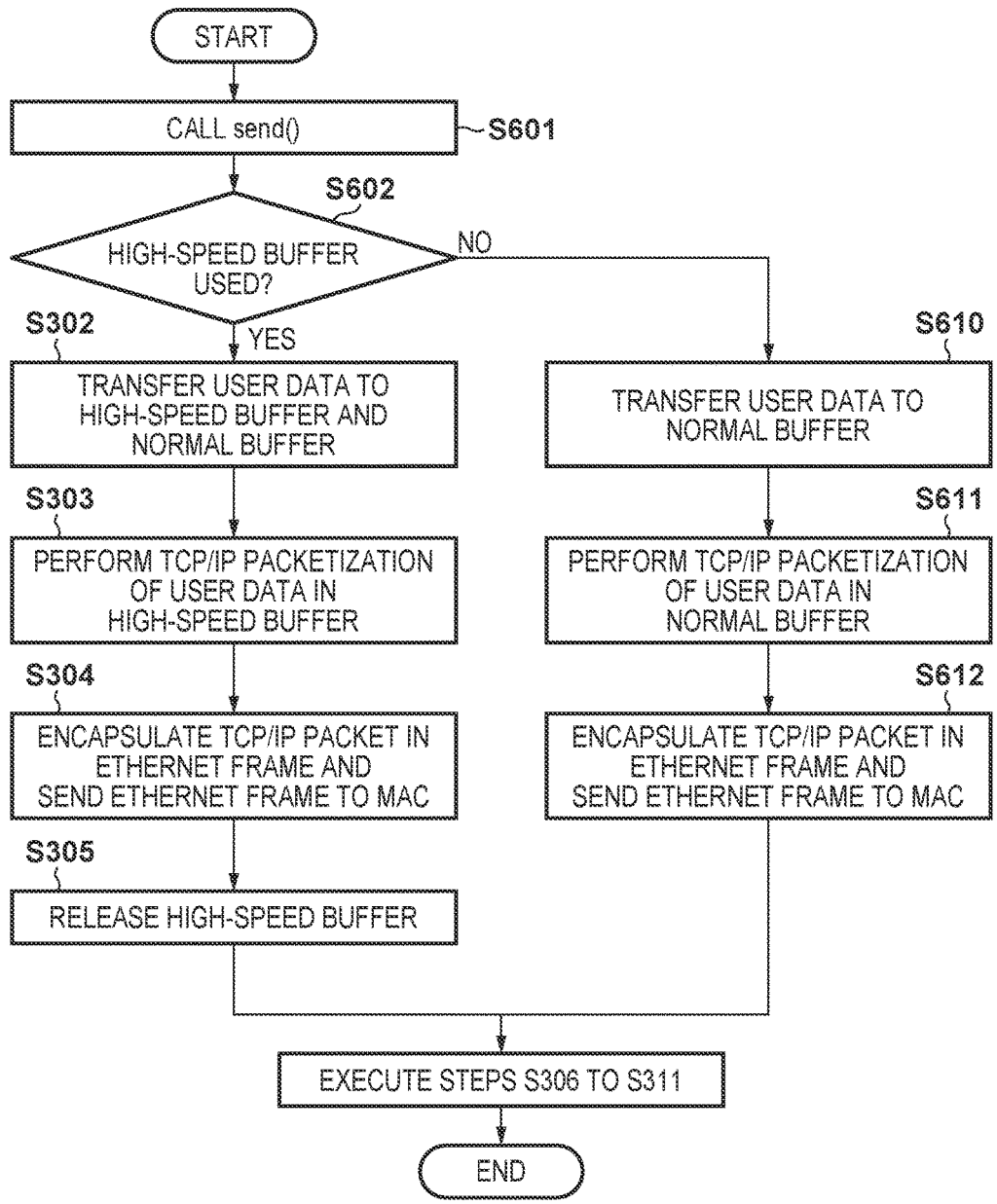
FIG. 6 is a flowchart showing communication processing according to the third embodiment.

FIG. 6 is a flowchart showing communication processing by a communication apparatus 100 according to the third embodiment. Data sending by a socket API send( ) of the communication apparatus in the third embodiment will be described below with reference to FIG. 6. First, in step S601, an application executed by a CPU 102 calls the send( ). After the send( ) is called, in step S602, a network driver executed by the CPU 102 determines whether to utilize the high-speed buffers in the communication processing. For example, if it is determined that a connection is performing high-speed communication, the network driver determines that the high-speed buffers are utilized. For example, the network driver estimates the communication rate (RTT: Round Trip Time) of the connection by measuring an acknowledgement (ACK) reception interval and determines whether the connection is performing the high-speed communication based on whether this communication rate exceeds a predetermined value. Then, the network driver determines to use the high-speed buffers if the connection is performing the high-speed communication.

If the network driver determines that the connection is performing the high-speed communication (if the network driver determines to use the high-speed buffers), the process advances to step S302. If the network driver determines that the connection is not performing the high-speed communication (if the network driver determines not to use the high-speed buffers), the process advances to step S610. Note that whether communication is the high-speed communication can be determined based on whether the acknowledgement (ACK) reception interval exceeds a predetermined determination time. In this embodiment, a timer management unit 104 shown in FIG. 1 counts an elapsed time from sending of data (packet) with respect to each connection. When the determination time elapses, the timer management unit 104 issues, to the CPU 102 (the network driver executed by the CPU 102), a signal indicating the lapse of the determination time for the corresponding connection. The network driver determines that the communication is the high-speed communication if the acknowledgement has been received before receiving the signal indicating the lapse of the determination time.

If the network driver determines to use the high-speed buffers in step S602, the process advances to step S302 in order to execute the communication processing which uses both the high-speed buffers and the normal buffers. The processing operations in steps S302 to S311 are as described in the first embodiment (FIG. 3). On the other hand, if the network driver determines that the communication is not the high-speed communication, sending target data is not transferred to each high-speed buffer and the process advances from step S602 to step S610. That is, transmission of the sending target data to each high-speed buffer is inhibited.

In step S610, the network driver transfers user data as the sending target data to each normal buffer in a DRAM 101. This data transfer may be executed by a data transfer unit 106 or the CPU 102. Next, in step S611, the network driver calculates a checksum by using the user data transferred to each normal buffer, generates a TCP/IP header, and performs the TCP/IP packetization of the user data on the normal buffer. Furthermore, in step S612, the network driver generates an Ethernet header, encapsulates a TCP/IP packet in an Ethernet frame on each normal buffer, and sends the obtained Ethernet frame to a MAC 107. Then, the process advances to step S306.

As described above, according to the third embodiment, if the network driver determines that the connection is performing the high-speed communication, communication which uses the high-speed buffers and the normal buffers (steps S302 to S311 in FIG. 6) is executed. On the other hand, if the network driver determines that a connection is performing low-speed communication, communication which uses not the high-speed buffers but the normal buffers (steps S610 to S612 and S306 to S311 in FIG. 6) is executed. Utilization of a high-speed buffer according to the communication rate is implemented, making it possible to use the high-speed buffers more efficiently.

In the above-described embodiment, an example has been described in which whether to use the high-speed buffers (step S602) is switched based on whether the communication rate is high (based on the round trip time). However, the present invention is not limited to this. Whether to use the high-speed buffers may be determined by, for example, methods to be described below or some combinations out of these methods. Note that in (1), (2), (3), and (6) below, determination is performed on a packet to be generated from now to send user data. This is because determination processing in step S602 is executed before packetizing the user data.

(1) In step S602, the network driver checks a destination address as one of the attributes of a packet and determines to use the high-speed buffers if this address matches a predetermined address. An IP address can be used as the destination address. This allows the high-speed communication with a specific communication partner.

(2) In step S602, the network driver checks a destination port or a transmission source port included in the attribute of a packet and determines to use the high-speed buffers if the destination port or the transmission source port matches a predetermined port number. The predetermined port number is often allocated to a specific communication protocol. Therefore, according to this method, the high-speed communication is performed for communication which uses the specific communication protocol. For example, if the specific communication protocol is a TCP, an arrangement is obtained in which only TCP communication can perform the high-speed communication.

(3) In step S602, the network driver checks the destination port or the transmission source port included in the attribute of the packet and determines to use the high-speed buffers if a combination of the destination port and the transmission source port matches a combination of predetermined port numbers. This allows the high-speed communication in a specific connection.

(4) In step S602, the network driver checks a packet loss rate in a connection used to send user data and determines to use the high-speed buffers if the packet loss rate does not exceed a predetermined threshold. This makes it possible to implement the high-speed communication when the user data is sent in an environment having a low packet loss rate.

(5) In step S602, the network driver determines the data size of the user data as the sending target when the socket API send( ) is called and determines to use the high-speed buffers if the data size exceeds a predetermined threshold. This allows the high-speed communication when sending a large amount of data.

(6) In step S602, the network driver determines the data type of the packet and determines to use the high-speed buffers if the data type of the packet matches a predetermined data type. This allows the high-speed communication for a specific data. For example, for an RTP (Real-time Transport Protocol), an arrangement is possible in which the high-speed communication is applied to only a specific payload format.

(7) In step S602, the network driver determines whether the high-speed buffers are exhausted (a free area of each high-speed buffer runs out) and determines to use the high-speed buffers if the high-speed buffers are not exhausted. For example, the network driver determines to use each high-speed buffer if a free capacity of the high-speed buffer exceeds a predetermined value.

<Fourth Embodiment>

Figure 7:
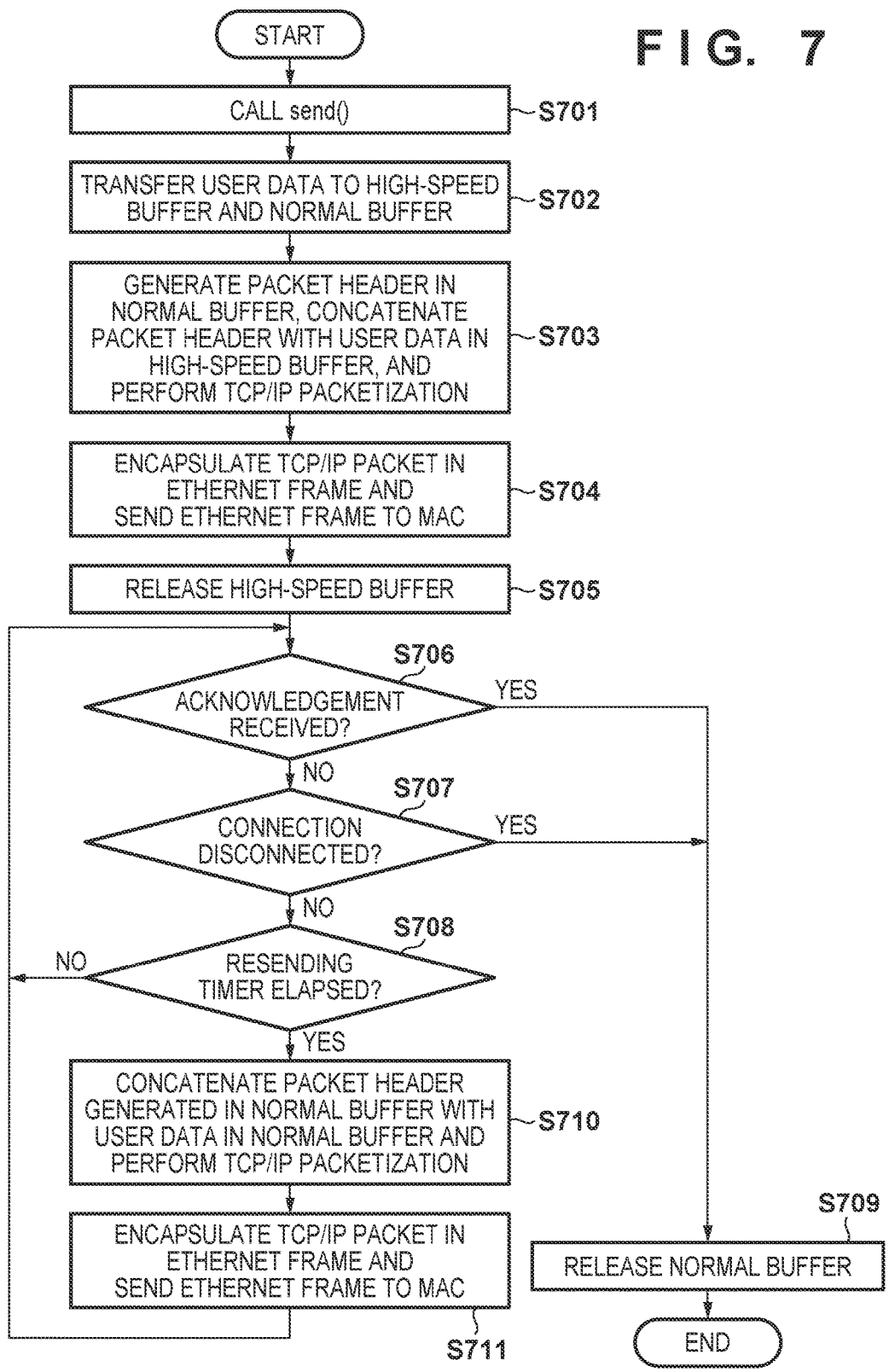
FIG. 7 is a flowchart showing communication processing according to the fourth embodiment.

Communication processing of the fourth embodiment will now be described. In the first embodiment, the packet header of the TCP/IP packet is generated (step S310) each time data is resent. However, the present invention is not limited to this. In the fourth embodiment, when sending data generated based on user data as a sending target includes user data and a header portion generated based on the user data, the header portion is held by each normal buffer so that it can be reused when resending the user data. That is, in the fourth embodiment, an arrangement capable of reusing the generated packet header of the TCP/IP packet will be described. Note that the arrangement of a communication apparatus of the fourth embodiment is the same as in the first embodiment (FIG. 1). Data sending by a socket API send( ) of the fourth embodiment will be described below with reference to a flowchart of FIG. 7.

First, in step S701, an application executed by a CPU 102 calls the send( ). After the send( ) is called, in step S702, a network driver executed by the CPU 102 uses a data transfer unit 106 to transfer the user data as the sending target data to two points of a high-speed buffer and the normal buffer.

In step S703, the network driver calculates a checksum by using the user data held by the high-speed buffer and generates a packet header in a normal buffer. Then, the network driver concatenates the packet header generated in the normal buffer and the user data held by the high-speed buffer with each other, and performs the TCP/IP packetization of the user data. Further, in step S704, the network driver generates an Ethernet header, encapsulates a TCP/IP packet in an Ethernet frame, and sends the obtained Ethernet frame to a MAC 107. In step S705, the encapsulated TCP/IP packet in the Ethernet frame has been sent, releasing the high-speed buffer.

Next, the network driver determines whether an acknowledgement has been received, whether a connection with a communication partner has been disconnected, and whether it is a timing to resend the packet. That is, if the network driver determines in step S706 that the acknowledgement has been received or determines in step S707 that the connection has been disconnected, the process advances to step S709. On the other hand, if the acknowledgement has not been received and if the connection with the communication partner has not been disconnected, the process advances to step S708. In step S708, the network driver determines whether a resending timer managed by a timer management unit 104 has elapsed (whether it is a timing to resend data). If the resending timer has not elapsed, the process returns to step S706. If the resending timer has elapsed, the process advances to step S710.

In step S710, the network driver concatenates the packet header generated in the normal buffer in a DRAM 101 (step S703) and the user data transferred to the normal buffer by the data transfer unit 106 (step S702) with each other. Consequently, the TCP/IP packetization of the user data held by the normal buffer is performed. In step S711, the network driver generates an Ethernet header, encapsulates the TCP/IP packet generated in step S710 in the Ethernet frame, and sends the obtained Ethernet frame to the MAC 107. Then, the process returns to step S706. On the other hand, in step S709, the network driver releases the normal buffer used to generate the packet header in step S703 and the normal buffer used as the transfer destination of the user data by the data transfer unit 106 in step S702.

As described above, according to the fourth embodiment, in communication that needs an acknowledgement, a reusable packet header is generated for the normal buffer. Therefore, the speed of packet generation at the time of data resending is increased as compared with the first embodiment. Note that also in the fourth embodiment, the high-speed buffer is released concurrently with sending to the communication partner without waiting for reception of the acknowledgement and the normal buffer is reserved for resending until the acknowledgement is received from the communication partner. Therefore, efficient use of the high-speed buffer by a connection which performs high-communication is implemented.

In each embodiment described above, the TCP/IP protocol has been exemplified. However, the present invention is not limited to this. The present invention is applicable to, for example, a protocol such as a UDP protocol which is required to perform resending until the acknowledgement is confirmed after sending data.

As described above, according to each embodiment, it becomes possible to utilize a high-speed data buffer efficiently and to implement stable high-speed communication.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126871, filed Jun. 24, 2015, which is hereby incorporated by reference herein in its entirety.

What is claimed is:

1. A communication apparatus comprising:
a first memory configured to store data to be sent to another communication apparatus;
a second memory accessible at higher speed than the first memory;
one or more processors; and
a memory coupled to the one or more processors and having instructions stored thereon which, when executed by the one or more processors, cause the communication apparatus to:
transfer the data to the second memory concurrently with transfer of the data to the first memory;
send the transferred data from the second memory to the another communication apparatus;
discard the data from the second memory after the sending and before receiving a response to the data from the another communication apparatus; and
in a case where the communication apparatus is to resend the data, resend the data to the another communication apparatus based on the data transferred to the first memory.

2. The communication apparatus according to claim 1, wherein the instructions, when executed by the one or more processors, further cause the communication apparatus to:
receive the response to the data from the another communication apparatus; and
discard the data from the first memory when the response is received.

3. The communication apparatus according to claim 1, wherein the instructions, when executed by the one or more processors, further cause the communication apparatus to generate a packet including the data based on the data,
wherein sending the transferred data including sending the generated packet.

4. The communication apparatus according to claim 3, wherein the generated packet includes a header portion generated based on the data,
wherein the header portion is stored in the first memory, and
wherein the instructions, when executed by the one or more processors, further cause the communication apparatus to regenerate a packet based on the data and the header portion stored in the first memory when the data is resent.

5. The communication apparatus according to claim 4, wherein the instructions, when executed by the one or more processors, further cause the communication apparatus to send the regenerated packet to the another communication apparatus.

6. The communication apparatus according to claim 1, wherein the first memory comprises a buffer formed by a DRAM, and
wherein the second memory comprises a buffer formed by an SRAM.

7. The communication apparatus according to claim 1, wherein the instructions, when executed by the one or more processors, further cause the communication apparatus to generate the data, and
the communication apparatus further comprising a third memory configured to store the generated data,
wherein the instructions, when executed by the one or more processors, further cause the communication apparatus to transfer the data from the third memory to the second memory concurrently with transfer of the data from the third memory to the first memory.

8. The communication apparatus according to claim 7, wherein the instructions, when executed by the one or more processors, further cause the communication apparatus to discard the data from the third memory when the data is transferred from the third memory to both the first memory and the second memory.

9. The communication apparatus according to claim 1, wherein the instructions, when executed by the one or more processors, further cause the apparatus to cause the communication apparatus to perform DMA (Direct Memory Access) transfer.

10. The communication apparatus according to claim 1, wherein the instructions, when executed by the one or more processors, further cause the apparatus to cause the communication apparatus to determine whether to use the second memory,
wherein in a case that it is determined not to use the second memory, transfer the data to the first memory without transferring the data to the second memory, and send the data from the first memory to the another communication apparatus.

11. The communication apparatus according to claim 10, wherein the instructions, when executed by the one or more processors, further cause the apparatus to cause the communication apparatus to determine whether to use the second memory based on one of a communication rate and a packet loss rate of a connection between the communication apparatus and the another communication apparatus.

12. The communication apparatus according to claim 10, wherein the instructions, when executed by the one or more processors, further cause the apparatus to cause the communication apparatus to determine whether to use the second memory based on at least one of a destination address, a destination port number, and a transmission source port number of the data.

13. The communication apparatus according to claim 10, wherein the instructions, when executed by the one or more processors, further cause the communication apparatus to determine whether to use the second memory based on predetermined size information according to the data.

14. The communication apparatus according to claim 10, wherein the instructions, when executed by the one or more processors, further cause the communication apparatus to determine whether to use the second memory based on a type of the data.

15. The communication apparatus according to claim 10, wherein the instructions, when executed by the one or more processors, further cause the communication apparatus to determine whether to use the second memory based on a free capacity of the second memory.

16. A control method of a communication apparatus, the method comprising:
   transferring data to be sent to another communication apparatus to a second memory accessible at higher speed than a first memory concurrently with transfer of the data to the first memory;
   sending the transferred data from the second memory to the another communication apparatus;
   discarding the data from the second memory after sending the data and before receiving a response to the data from the another communication apparatus; and
   in a case where the communication apparatus is to resend the data, resending the data to the another communication apparatus based on the data transferred to the first memory.

17. A non-transitory computer-readable storage medium which stores a program causing a computer to execute a control method of a communication apparatus, the control method comprising:
   transferring data to be sent to another communication apparatus to a second memory accessible at higher speed than a first memory concurrently with transfer of the data to the first memory;
   sending the transferred data from the second memory to the another communication apparatus;
   discarding the data from the second memory after sending the data and before receiving a response to the data from the another communication apparatus; and
   in a case where the communication apparatus is to resend the data, resending the data to the another communication apparatus based on the data transferred to the first memory.

* * * * *